United States Patent Office 3,840,514
Patented Oct. 8, 1974

3,840,514
WATER-SOLUBLE DISAZO DYESTUFFS OBTAINED BY OXIDATION OF RESORCINOL AZO SULFO-BENZENEAZO-1-SULFOPHENYL - 3 - METHYL-5-PYRAZALONES
Andre Louis Sailer and Albert Andre Marcel Caste, Saint-Clair du Rhone, France, assignors to Pechiney Ugine Kuhlmann, Paris, France
No Drawing. Continuation-in-part of application Ser. No. 829,848, May 27, 1969, which is a continuation-in-part of application Ser. No. 626,431, Mar. 28, 1967, now abandoned. This application July 20, 1972, Ser. No. 273,551
Int. Cl. C07c *105/00;* C09b *43/06;* D06p *3/24*
U.S. Cl. 260—143                                3 Claims

ABSTRACT OF THE DISCLOSURE

Dye stuff obtained by oxidising the compound of the formula:

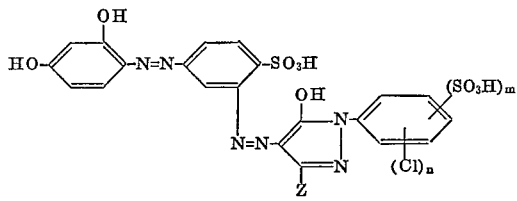

in which Z is methyl or carboxy, $m$ is one or two and $n$ is zero, one or two, the oxidation being effected in alkaline medium at a temperature of from 40° C. to 100° C. for from 10 minutes to 4 hours inclusive with a quantity of oxidising agent, calculated as 10% solution of hydrogen peroxide, not more than three times the weight of the compound of the above formula which are suitable for dyeing polyamide fibres and animal fibres in bright shades with good fastness to light, to washing, and to solvents.

---

This application is a continuation-in-part of application Ser. No. 829,848 filed May 27, 1969, which in turn is a continuation-in-part of application Ser. No. 626,431 filed Mar. 28, 1967, now abandoned.

The present invention relates to new azo dyestuffs derived from 1,3-diaminobenzene-4-sulphonic acid of general formula:

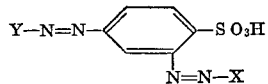

in which X represents the residue of a phenol, pyrazolone, acetylacetarylide, benzenic-amine, hydroxyquinoline or a benzene-azo-benzenic dyestuff, and Y represents the residue of a phenol, naphthol, pyrazolone, acetylacetarylide, benzenic- or naphthalenic-amine, hydroxyquinoline or a mono- or poly-azo dyestuff.

Dyestuffs of the above formula may be prepared for example, from 1,3-diaminobenzene-4-sulphonic acid by acylation of the 1-amino group e.g. by means of a mono- or dicarboxylic acid, diazotisation of the 4-sulpho-1-acyl-amino-3-amino-benzene, coupling the diazo derivative thus obtained with a compound of the formula HX, deacylation, diazotisation of the aminoazo compound obtained and coupling with a compound of the formula HY, X and Y having the same significance as above.

Among suitable compounds of the formulae XH and YH are, for example, the phenols, naphthols, pyrazolones or acetylacetarylides in which the positions adjacent to hydroxy or keto functions are free for the coupling reaction, as well as their derivatives substituted, for example, by halogen atoms or alkyl, alkoxy, nitro, amino, acylamino, sulpho, carboxy, cyano, or sulphonamido groups. Other suitable compounds of formula XH and YH are, for example, the benzene or naphthalene amines which have an ortho position to the primary, secondary or tertitary amino group free for coupling, as well as their derivatives substituted, for example, by hydroxy groups or by the substituents mentioned above. Hydroxy-quinolines or mono- or poly-azo dyestuffs, which may be metallisable or metalliferous, and which have a position ortho to a hydroxy group free, may also be used for example as coupling compounds.

By means of the process of the invention dyestuffs of formula I may be obtained with good yields and of good purity. In particular, it enables the numerous secondary reactions to be avoided which follow the tetrazotisation of 1,3-diaminobenzene-4-sulphonic acid and its successive action on various coupling agents.

The invention comprises in addition the dyestuffs obtained by oxidising dyestuffs of the formula (I), especially dyestuffs of formula (I) in which X represents a pyrazolone residue and Y represents a resorcinol residue.

The oxidation of the dyestuffs of formula (I) may be carried out in a neutral or acid medium, but is preferably effected in an alkaline (pH from 8 to 13) medium, for example in the presence of ammonia or an alkali metal hydroxide, bicarbonate or carbonate. The oxidation is preferably effected at a temperature of from 40° C. to 100° C.; its duration may vary between 10 minutes and 4 hours according to the temperature and to the quantity of the oxidising agent. The oxidation may be facilitated by the presence of a metal salt such as for example, a chloride or sulphate of iron, copper or chromium. The oxidation may be effected, for example, by air, a hypochlorite, a peroxide, for example hydrogen peroxide, a presalt, sodium or potassium permanganate, sodium or potassium dichromate, or a metal oxide such as manganese dioxide. The shade of the dyestuff obtained may vary according to the nature and quantity of the oxidising agent used. The quantity by weight of oxidising agent, calculated as 10% solution of hydrogen peroxide, may be up to three times the weight of the dyestuff to be oxidised.

The dyestuffs of the invention are suitable for dyeing polyamide fibres and animal fibres such as silk, wool and leather. On leathers coming from various tanning processes they give colorations which are very bright and have very good general fastness.

The invention is illustrated by, but not limited to, the following examples in which the parts indicated are parts by weight unless the contrary is stated.

EXAMPLE 1

18.8 parts of 1,3-diaminobenzene-4-sulphonic acid are dissolved in 140 parts of water at 80°C. by the addition of a 10N solution of caustic soda in sufficient quantity to obtain a pH equal to 7. 10.2 parts of acetic anhydride are introduced into the cooled solution in a period of 90 minutes simultaneously with 15 parts of sodium bicarbonate. The mixture is stirred for 30 minutes.

To the solution obtained are added 6.9 parts of sodium nitrite in a 50% solution and the mixture is poured over a period of 30 minutes into a mixture at a temperature of 5° C. comprising 50 parts of hydrochloric acid and 50 parts of water. The mixture is stirred for an hour at 5° C. and the diazonium chloride obtained is introduced into a solution of 25.5 parts of 4'-sulpho-1-phenyl-3-methyl-5-pyrazolone in 250 parts of water containing 13 parts of a solution of sodium hydroxide at 400 g. per litre and containing 35 parts of sodium carbonate. The mixture is stirred for an hour, 110 parts of a 21° Bé. solution of hydrochloric acid are added, and it is boiled for one hour in order to liberate the previously acetylated amino group.

The dyestuff obtained is salted out by the addition of 115 parts of sodium chloride, and filtered off. The drained paste is dissolved in 400 parts of water with 12.5 parts of sodium carbonate. 6.9 parts of sodium nitrite in a 50% solution are added, the mixture is cooled to 8° C. and introduced into a solution of 50 parts of 21° Bé. hydrochloric acid in 50 parts of water. The mixture is stirred for an hour at 8° C. and the diazonium salt obtained is poured into a solution of 35 parts of the disodium salt of 2 - hydroxy-naphthalene-6,8-disulphonic acid in 200 parts of water containing 25 parts of sodium carbonate.

When the reaction is finished, the dyestuff is salted out from its solution by the addition of sodium chloride. The dyestuff is separated by filtration and dried. An orange powder is obtained which dyes silk wool and leathers from various tanning processes in orange shades with good general fastness.

The following table summarises a number of examples carried out under the same conditions.

| Ex. | First coupling compound: XH | Second coupling compound: YH | Shade on leather |
|---|---|---|---|
| 2 | 4'-sulpho-1-phenyl-3-methyl-5-pyrazolone. | Acetyl-acetanilide. | Yellow. |
| 3 | do | o-Chloro-acetoacetanilide. | Do. |
| 4 | do | 2-hydroxy-naphthalene-3,6-disulphonic acid. | Red. |
| 5 | do | 1-hydroxy-8-aminonaphthalene-3,6-disulphonic acid. | Violet. |
| 6 | 4'-sulpho-2',5'-dichloro-1-phenyl-3-methyl-5-pyrazolone. | Acetyl-acetanilide. | Green yellow. |
| 7 | 4'-sulpho-1-phenyl-3-methyl-5-pyrazolone. | [4-nitro-benzene]-<1 azo 2>-[1-amino-8-hydroxy-3,6-disulphonaphthalene]. | Bluish green. |
| 8 | 1,3-dihydroxy-benzene. | do | Yellowish green. |
| 9 | 4'-sulpho-1-phenyl-3-methyl-5-pyrazolone. | 4'-sulpho-1-phenyl-3-carboxy-5-pyrazolone. | Reddish yellow. |
| 10 | 4'-sulpho-2',5'-dichloro-1-phenyl-3-methyl-5-pyrazolone. | o-Chloro-acetoacetanilide. | Green yellow. |
| 11 | do | o-Methoxy-acetoacetanilide. | Do. |
| 12 | 2',5'-disulpho-1-phenyl-3-methyl-5-pyrazolone. | do | Do. |

EXAMPLE 13

(a) The solution of the diazonium chloride of 1-acetylamino - 3 - amino-benzene-4-sulphonic acid obtained in Example 1 is treated with 100 parts of sodium chloride. The product is stirred for 30 minutes and filtered, and the paste obtained is introduced in successive portions into a solution at 0° C. of 13.8 parts of salicylic acid in 80 parts of water containing 25 parts of sodium hydroxide at 400 g. per litre. The mixture is stirred for two hours, 110 parts of 21° Bé. hydrochloric acid are added, and it is heated for one hour at 85° C. then salted out and the precipitate obtained is filtered off.

The drained paste is dissolved in 400 parts of water with 20 parts of sodium carbonate, 6.9 parts of sodium nitrite in a 50% solution are added, and the solution is introduced over a period of 30 minutes into a mixture of 50 parts of 21° Bé. hydrochloric acid and 50 parts of water. The product is stirred for one hour at 5° C.

(b) The diazonium salt obtained is introduced into the solution of the monoazo dyestuff resulting from coupling, at a pH less than 3, the diazo derivative of 17.3 parts of 1-amino-benzene-4-sulphonic acid with 11 parts of 1,3-dihydroxybenzene and containing 25 parts of sodium carbonate. The dyestuff obtained is salted out from its solution by the addition of sodium chloride acidified with hydrochloric acid to pH 2.5 and is filtered off and dried. It is in the form of a brown powder which dyes leathers from various tanning processes in orange brown shades endowed with good general fastness.

The following table summarises a number of examples analogous to Example 13.

| Ex. | First coupling compound | Second coupling compound | Shade on leather |
|---|---|---|---|
| 14 | Salicylic acid | [4-nitro-2-sulpho-benzene]-<1 azo 1>-[2,4-dihydroxybenzene]. | Yellowish brown. |
| 15 | do | [5-nitro-6-hydroxy-3-sulpho-benzene]-<1 azo 1>-[2,4-dihydroxy-benzene]. | Reddish brown. |
| 16 | do | 3'-hydroxy-2-methyldiphenyl-amine. | Orange brown. |
| 17 | do | [3-sulpho-4-phenylamino-benzene]-<1 azo 4>-[1,3-dihydroxybenzene]. | Deep reddish brown. |

EXAMPLE 18

(a) 18.9 parts of 3-amino-4-hydroxy-benzenesulphonic acid are suspended in 80 parts of water containing 2 parts of 21° Bé. hydrochlorice acid. The mixture is cooled to 10° C. and diazotised in a period of 45 minutes with 6.9 parts of sodium nitrite in a 50% solution. A solution of 11.6 parts of 1,3-dihydroxy-benzene in 70 parts of water at 0° C. is introduced, and the mixture is added to a solution at 0° C. of 30 parts of sodium hydroxide at 400 g. per litre and 70 parts of water. The product is acidified with 55 parts of 21° Bé. hydrochloric acid, heated, precipitated by salting out and the solid filtered off.

The drained paste is mixed with 250 parts of water at 60° C., 23 parts of a concentrated solution of ammonia and then a solution of 23 parts of hydrated copper sulphate in 100 parts of water are added, and the mixture is stirred for 30 minutes at 60° C. The monoazo dyestuff is then precipitated by means of sodium chloride and filtered off; the paste is dissolved in 500 parts of water with 25 parts of sodium carbonate.

(b) The diazonium salt used in Example 13 is introduced into the solution of the monoazo dyestuff obtained in (a). The dyestuff formed is precipitated, filtered off, and dried. It is in the form of a red brown powder which dyes leathers from various tanning processes in a reddish brown shade which is particularly fast to light, having good general properties.

EXAMPLE 19

An aqueous 50% solution of 6.9 parts of sodium nitrite is added to a solution at pH 7 of 23 parts of 3-amino-1-acetylamino-benzene-4-sulphonic acid in 200 parts of water, and the mixture is run in a period of 30 minutes onto 40 parts of 20° Bé. hydrochloric acid diluted with 100 parts of water and 100 parts of ice so as to maintain the temperature at about 0° C. Diazotisation is carried out for 2 hours, then the diazo derivative is run in a period of 30 minutes onto a solution at pH 7 of 33.4 parts of 2',5'-disulpho-1-phenyl-3-methyl-5-pyrazolone in 200 parts of water and 40 parts of sodium carbonate. The coupling is quickly finished. The product is then acidified with 100 parts of 20° Bé. hydrochloric acid, taken to a temperature of 100° C. and kept at the boil for 2 hours. The amino-azo dyestuff formed is precipitated by the addition of sodium chloride and is filtered off.

The paste is redissolved in 1000 parts of water by the addition of a 40% aqueous solution of sodium hydroxide until a pH of 7 is obtained. After the addition of an aqueous solution containing 6.9 parts of sodium nitrite, the mixture is run in a period of 30 minutes onto 35 parts of 20° Bé. hydrochloric acid diluted with 100 parts of water and 100 parts of ice. Diazotisation is effected for 2 hours at 5° C. then the product is run onto a solution of 17.4 parts of N-acetylacetylaniline and 30 parts of sodium carbonate in 300 parts of water. Coupling is rapid. When it is finished, the product is acidified with 20° Bé. hydrochloric acid and the dyestuff is precipitated by the addition of sodium chloride. The [2',5'-disulpho-1 - phenyl - 3 - methyl-5-hydroxy-pyrazole]-<4 azo 3>-[4-sulpho-benzene]-<1 azo 2>-[N - phenyl - acetoacetamide] is filtered off and dried. This dyestuff is in the form of a yellow powder, very soluble in water, which dyes silk, wool and leathers tanned by various methods a very bright greenish-yellow shade having excellent fastness to the usual tests.

The following table summarises other examples of dyestuffs of formula (I) obtained under the same conditions as in Example 19.

| Ex. | 1st coupling compound: XH | 2d coupling compound: YH | Shade on leather |
|---|---|---|---|
| 20 | 2',5'-disulpho-1-phenyl-3-methyl-5-pyrazolone. | 2-chloro-N-aceto-acetylaniline. | Greenish yellow. |
| 21 | do | 1,3-dihydroxybenzene. | Yellow. |
| 22 | 4'-sulpho-1-phenyl-3-methyl-5-pyrazolone. | do | Do. |
| 23 | do | 2,5-dimethoxy-4-chloro-N-acetoacetylaniline. | Do. |
| 24 | do | 2-sulpho-N-aceto-acetylaniline. | Greenish yellow. |
| 25 | 4'-sulpho-1-phenyl-3-carboxy-5-pyrazolone. | 1,3-dihydroxybenzene. | Reddish yellow. |
| 26 | 3'-sulpho-1-phenyl-3-methyl-5-pyrazolone. | 2',5'-disulpho-1-phenyl-3-methyl-5-pyrazolone. | Yellow. |
| 27 | 2'-chloro-5'-sulpho-1-phenyl-3-methyl-5-pyrazolone. | 2,5-dimethoxy-4-chloro-N-acetoacetylaniline. | Do. |
| 28 | do | 2-sulpho-N-aceto-acetylaniline. | Greenish yellow. |
| 29 | do | 2',5'-disulpho-1-phenyl-3-methyl-5-pyrazolone. | Yellow. |
| 30 | do | 1,3-dihydroxybenzene. | Do. |
| 31 | 2',5'-dichloro-4'-sulpho-1-phenyl-3-methyl-5-pyrazolone. | 2',5'-disulpho-1-phenyl-3-methyl-5-pyrazolone. | Do. |
| 32 | do | 2-sulpho-N-acetoacetyl-aniline. | Greenish yellow. |
| 33 | do | 1,3-dihydroxybenzene. | Yellow. |
| 34 | 2-methoxy-N-acetoacetyl-aniline. | 2',5'-disulpho-1-phenyl-3-methyl-5-pyrazolone. | Greenish yellow. |

EXAMPLE 35

57.4 parts of the [2,4-dihydroxybenzene]-<1 azo 1>-[4-sulpho-benzene]-<3 azo 4>-[4' - sulpho-1-phenyl-3-methyl-5-hydroxypyrazole] described in Example 22 are dissolved in 500 parts of water by means of 200 parts of a 20% solution of ammonia. The solution is heated to 70° C. and 30 parts of a solution of hydrogen peroxide containing 60.5 g. per litre are run in a period of 30 minutes. The mixture is further stirred for a short time in order to allow the reaction to be completed, and is then acidified by the addition of 20° Bé. hydrochloric acid. The dyestuff is precipitated by the addition of sodium chloride and is filtered off. The dry dyestuff is in the form of a powder which is very soluble in water and which dyes leathers tanned by various methods a very yellow light chestnut shade.

If 20 parts of hydrogen peroxide containing 60.5 g. per litre are used instead of the 30 parts indicated, a dyestuff is obtained which dyes leathers tanned by various methods a slightly redder shade.

EXAMPLE 36

If in the preceding example, before running in the 30 parts of hydrogen peroxide, a solution of 5 parts of ferric chloride in 10 parts of water is added, a dyestuff is obtained which dyes leathers tanned by various methods a slightly redder shade.

EXAMPLE 37

If in Example 35, the ammonia is replaced by 40 parts of sodium carbonate, a dyestuff is obtained which dyes leathers tanned by various methods a slightly yellower shade.

EXAMPLE 38

If the process is carried out as in Example 35, but the hydrogen peroxide addition is replaced by the bubbling through of air for 3 hours, a dyestuff of similar properties is obtained.

EXAMPLE 39

If in Example 35 the hydrogen peroxide is replaced by a solution of 10 parts of potassium dichromate or 10 parts of manganese dioxide or 6 parts of potassium permanganate or 30 parts of a 30° Bé. solution of sodium hypochlorite, dyestuffs are obtained of which the shades and properties are similar to those obtained with the dyestuff of Example 35.

The following table indicates the shade on leather of other dyestuffs obtained by one or other of the processes of Examples 35 to 39.

| Ex. | Dis-azo dyestuff initially used | Shade on leather |
|---|---|---|
| 40 | [2,4-dihydroxy-benzene]-<1 azo 1>-[4-sulpho-benzene]-<3 azo 4>-[4'-sulpho-1-phenyl-3-carboxy-5-hydroxy-pyrazole]. | Yellowish-brown. |
| 41 | [2,4-dihyroxy-benzene]-<1 azo 1>-[4-sulpho-benzene]-<3 azo 4>-[2',5'-dichloro-4'-sulpho-1-phenyl-3-methyl-5-hydroxy-pyrazole]. | Yellowish light chestnut. |

EXAMPLE 42

The diazo derivative from 13.8 parts of 4-nitro-aniline is run onto a solution of 61.8 parts of the disodium salt of the dyestuff described in Example 22 in 1000 parts of water containing 30 parts of sodium carbonate. When the coupling is finished, the dyestuff is precipitated by the addition of 20° Bé. hydrochloric acid, then sodium chloride. The filtered off and dried dyestuff is in the form of a brown powder which is very soluble in water and which dyes leathers tanned by various methods a yellow-orange shade which is particularly fast to the usual tests.

The following Table summarizes other examples of dyestuffs prepared as in the Example 42 and corresponding to the formula:

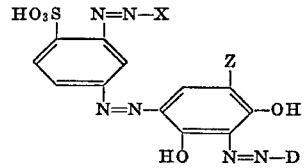

wherein Z represents a hydrogen atom or an arylazo radical of formula —N=N—D', D and D' each represents the residue of a diazotizable aromatic primary amine.

| Ex. | Coupling compound XH | Amine D—NH₂ | Z | Amine D'—NH₂ | Shade on leather |
|---|---|---|---|---|---|
| 43 | 4'-sulpho-1-phenyl-3-carboxy-5-pyrazolone | 4-nitroaniline | H | | Orange. |
| 44 | 4'-sulpho-1-phenyl-3-methyl-5-pyrazolone | do | —N=N—D' | 4-nitroaniline | Yellowish brown. |
| 45 | do | 1-amino-8-naphthol-3,6-disulphonic acid | H | | Deep yellowish brown. |
| 46 | do | 4-amino-4'-nitro-diphenylamine-2'-sulphonic acid. | —N=N—D' | 4-nitroaniline | Deep brown. |
| 47 | do | 2-amino-phenol-4-sulphonic acid | H | | Brown. |
| 48 | do | 4-chloro-2-aminophenol-6-sulphonic acid | H | | Yellowish brown. |

EXAMPLE 49

The tris-azo dyestuff described in Example 47 and prepared as indicated in Example 42 from 23 parts of 3-amino-1-acetylamino-benzene-4-sulphonic acid is dissolved in 1000 parts of water with a pH of 11 by the addition of a 40% solution of sodium hydroxide. An aqueous solution of 8.5 parts of ferric chloride is added and the mixture is stirred at the ambient temperature until metallisation is complete.

The dry dyestuff, isolated in the usual manner, is in the form of a powder, which is very soluble in water and which dyes leathers tanned by various methods a yellowish-brown shade.

EXAMPLE 50

A dyestuff with properties identical with those of the dyestuff of Example 49 is obtained if the diazo derivative of [3-amino-6-sulpho-benzene]- <1 azo 4> -[4'-sulpho-1-phenyl-3-methyl-5-hydroxy-pyrazole] is coupled with the iron complex of [2-hydroxy-5-sulphobenzene]- <1 azo 1> -[2,4-dihydroxy-benzene].

EXAMPLES 51 TO 55

The following Table indicates the shade on leather of the iron complexes of the isomeric dyestuffs of the formula:

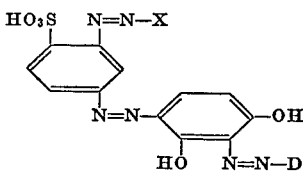

or

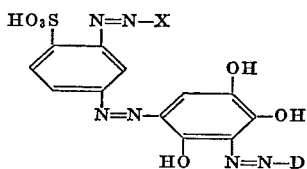

wherein D represents the residue of a diazotizable aromatic primary amine.

The iron complexes may be prepared either by the process of Example 49 or by that of Example 50.

| Ex. | Coupling compound XH | Diazotisable amine D—NH₂ | Shade on leather |
|---|---|---|---|
| 51 | 2',5'-dichloro-4'-sulpho-1-phenyl-3-methyl-5-pyrazolone. | 2-amino-phenol-4-sulphonic acid. | Yellowish brown. |
| 52 | 4'-sulpho-1-phenyl-3-methyl-5-pyrazolone. | 4-chloro-2-aminophenol. | Do. |
| 53 | do | 4-chloro-2-aminophenyl-6-sulphonic acid. | Very yellowish brown. |
| 54 | do | 4-nitro-2-aminophenol. | Do. |
| 55 | do | 4,6-dinitro-2-aminophenol. | Brown. |

EXAMPLE 56

The dyestuff [3-amino-6-sulpho-benzene]- <1 azo 4> -[4'-sulpho-1-phenyl-3-methyl-5 - hydroxy-pyrazole], obtained as indicated in the first paragraph of Example 19 from 23 parts of 1-amino-3-acetylamino-benzene-6-sulphonic acid and 25.4 parts of 4'-sulpho-1-phenyl-3-methyl-5-pyrazolone, is dissolved in 1000 parts of water containing sufficient amount of a 40% solution of caustic soda to bring the pH to 7. After the addition of an aqueous solution containing 6.9 parts of sodium nitrite, the mixture is run into 40 parts of 20° Bé. hydrochloric acid containing water and ice. When the diazotisation is finished, the mixture is introduced into a solution at pH 7 of 31.9 parts of 1-amino-8-naphthol-3,6-disulphonic acid in 200 parts of water containing 30 parts of sodium carbonate. The mixture is stirred for 2 hours, then an aqueous solution containing 6.9 parts of sodium nitrite is added and the mixture is run onto 80 parts of 20° Bé. hydrochloric acid containing water and ice. After diazotising for 2 hours, the diazo derivative is added to a solution of 11 parts of 1,3-dihydroxy-benzene and 40 parts of sodium carbonate. When the coupling is finished, the dyestuff is separated by the usual methods.

The dry dyestuff is in the form of a powder which is very soluble in water and which dyes leathers tanned by different methods a deep brown, slightly violet, shade.

EXAMPLE 57

The diazo derivative from 13.8 parts of 4-nitroaniline is introduced into a solution at pH 9 of the trisazo dyestuff prepared in the preceding example from 25.4 parts of 4'-sulpho-1-phenyl-3-methyl-5-pyrazolone. When the coupling is completed the dyestuff is isolated by the usual methods. It dyes leathers tanned by various methods a yellowish deep brown shade.

The following table gives other examples of dyestuffs obtained in the same way and corresponding to the general formula:

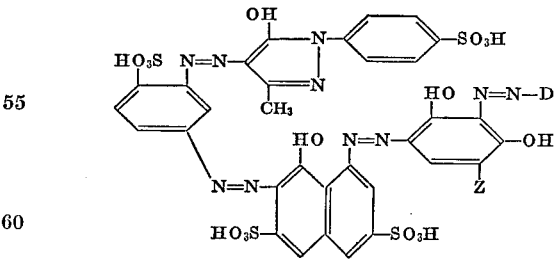

| Example | Amine D—NH₂ | Z | Amine D'—NH₂ | Shade on leather |
|---|---|---|---|---|
| 58 | 4-nitro-aniline | —N=N—D' | 4-nitro-aniline | Deep brown. |
| 59 | 4-amino-4'-nitrodiphenylamine-2'-sulphonic acid. | H | | Reddish deep brown. |
| 60 | do | —N=N—D' | 4-amino-4'-nitrodiphenylamine-2'-sulphonic acid. | Do. |
| 61 | do | —N=N—D' | 4-nitro-aniline | Deep brown. |

The dyestuffs of the examples are particularly interesting with regard to their good fastness to light, to washing and to solvents.

We claim:

1. Dyestuff obtained by oxidation of the compounds of the formula:

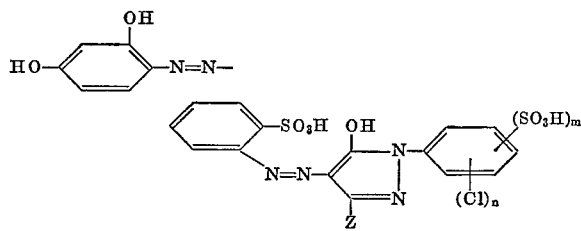

in which Z is methyl or carboxy, $m$ is one or two and $n$ is zero, one or two, the oxidation being effected in alkaline medium at a temperature of from 40° C. to 100° C. for from 10 minutes to 4 hours inclusive with a quantity of oxidising agent, calculated as 10% solution of hydrogen peroxide, not more than three times the weight of the compound of the above formula, said oxidising agent being selected from the group consisting of air, hypochlorite, hydrogen peroxide, sodium permanganate, potassium permanganate, sodium dichromate, potassium dichromate, and manganese dioxide.

2. Dyestuff according to claim 1 wherein Z is methyl, $m$ is one, and $n$ is zero.

3. Dyestuff according to claim 1 wherein the oxidation is effected in the presence of a chloride or sulphate of iron, copper or chromium.

References Cited

UNITED STATES PATENTS

| | | | |
|---|---|---|---|
| 2,446,662 | 8/1948 | Nies | 260—147 |
| 3,158,435 | 11/1964 | Gaetani et al. | 260—160 X |
| 2,951,069 | 8/1960 | Brenneisen et al. | 260—147 |

OTHER REFERENCES

Douglas et al., J. Chem. Soc. (London), volume of 1967, part C, pp. 674–680.

Newbold, J. Org. Chem., volume 27, pp. 3919–3923 (1962).

FLOYD DALE HIGEL, Primary Examiner

U.S. Cl. X.R.

8—13; 260—147, 148, 168, 208

UNITED STATES PATENT OFFICE
CERTIFICATE OF CORRECTION

Patent No. 3,840,514　　　　　　　　　　Dated October 8, 1974

Inventor(s) ANDRE LOUIS SAILER ET AL

It is certified that error appears in the above-identified patent and that said Letters Patent are hereby corrected as shown below:

IN THE HEADING:

Page 1, please insert after the names of the inventors -- assigned to Pechiney Ugine Kuhlmann, Paris, France --

Signed and sealed this 13th day of May 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,840,514          Dated October 8, 1974

Inventor(s) ANDRE LOUIS SAILER ET AL

It is certified that error appears in the above-identified patent and that said Letters Patent are hereby corrected as shown below:

In the heading, Page 1, before the identification of the class and subclass, insert -- Claims priority, application France, May 30, 1968     153,404 --.

Signed and Sealed this sixteenth Day of September 1975

[SEAL]

Attest:

RUTH C. MASON  
*Attesting Officer*

C. MARSHALL DANN  
*Commissioner of Patents and Trademarks*